US011732808B2

(12) United States Patent
Zaugg et al.

(10) Patent No.: US 11,732,808 B2
(45) Date of Patent: Aug. 22, 2023

(54) EXPLOSION PROTECTION VALVE FOR DECOUPLING SYSTEM PARTS OR WORKPIECES, COMPRISING A SEALING RING

(71) Applicant: Rico Sicherheitstechnik AG, Herisau (CH)

(72) Inventors: Loïc Zaugg, Herisau (CH); Walter Aloi, Widnau (CH); Jürgen Kern, Weinfelden (CH); Aleksandar Agatonovic, Eschlikon (CH); Daniel Zellweger, Gais (CH)

(73) Assignee: Rico Sicherheitstechnik AG, Herisau (CH)

( * ) Notice: Subject to any disclaimer, the term of this patent is extended or adjusted under 35 U.S.C. 154(b) by 36 days.

(21) Appl. No.: 17/601,889

(22) PCT Filed: Apr. 6, 2020

(86) PCT No.: PCT/EP2020/059721
§ 371 (c)(1),
(2) Date: Oct. 6, 2021

(87) PCT Pub. No.: WO2020/207949
PCT Pub. Date: Oct. 15, 2020

(65) Prior Publication Data
US 2022/0025975 A1 Jan. 27, 2022

(30) Foreign Application Priority Data
Apr. 8, 2019 (DE) ............... 10 2019 205 027.1

(51) Int. Cl.
*F16K 1/46* (2006.01)
*F16K 17/26* (2006.01)
(Continued)

(52) U.S. Cl.
CPC .............. *F16K 1/465* (2013.01); *F16K 17/26* (2013.01); *F16K 17/30* (2013.01); *F16K 27/02* (2013.01)

(58) Field of Classification Search
CPC .......... F16K 17/26; F16K 17/36; F16K 1/465; F16K 17/30; F16K 27/02
See application file for complete search history.

(56) References Cited

U.S. PATENT DOCUMENTS 3,063,467 A * 11/1962 Roberts, Jr. ............. F16K 1/465
251/364
3,510,103 A * 5/1970 Carsello .................... F16K 1/46
251/333
(Continued)

FOREIGN PATENT DOCUMENTS

CH 438039 A * 3/1966
CH 483040 A 6/1967
(Continued)

OTHER PUBLICATIONS

Machine Translation of EP0172364 obtained from espacenet.com Jan. 2023 (Year: 2023).*

*Primary Examiner* — Jessica Cahill
(74) *Attorney, Agent, or Firm* — McGlew and Tuttle, P.C.

(57) ABSTRACT

An explosion protection valve for decoupling system parts or workpieces for the installation in a pipeline, comprising
  a housing,
  a closing body which is axially guided inside the housing on a guide rod and can be shifted from a defined open position into a sealing closed position in the event of a pressure or suction wave in the pipeline in at least one closing movement direction,
  a spring assembly, which is in operative connection to the closing body, on the guide rod for holding the closing body in the open position, (Continued)

a sealing ring on the inner side of the housing, against which the closing body can be pressed in its closed position, and a receiving pocket, which is applied to the inner side of the housing and is preferably open counter to the closing movement direction (SB) of the closing body, for holding the sealing ring.

20 Claims, 5 Drawing Sheets

(51) Int. Cl.
    *F16K 17/30*     (2006.01)
    *F16K 27/02*     (2006.01)

(56) References Cited

U.S. PATENT DOCUMENTS

| | | | |
|---|---|---|---|
| 5,525,226 A * | 6/1996 | Brown | F16J 15/061 |
| | | | 210/DIG. 17 |
| 6,698,720 B2 | 3/2004 | Bouloy et al. | |
| 7,343,927 B2 | 3/2008 | Zellweger | |
| 9,333,381 B2 * | 5/2016 | Becker | F16K 17/32 |

FOREIGN PATENT DOCUMENTS

| | | | |
|---|---|---|---|
| CH | 674066 A5 | 4/1990 | |
| CH | 694303 A5 | 11/2004 | |
| CH | 694377 A5 | 12/2004 | |
| DE | 1953437 U | 1/1967 | |
| DE | 19625646 A1 | 1/1997 | |
| DE | 10141348 A1 | 3/2002 | |
| DE | 69524187 T2 | 6/2002 | |
| DE | 60117949 T2 | 10/2006 | |
| DE | 10141348 B4 | 5/2013 | |
| DE | 10213865 B4 | 6/2016 | |
| EP | 0172364 A1 * | 2/1986 | |
| EP | 1897668 A1 | 3/2008 | |
| EP | 1579134 B1 | 7/2010 | |
| EP | 2916050 A1 | 9/2015 | |
| WO | 2015132094 A1 | 9/2015 | |

* cited by examiner ial term of claim 1.

EXPLOSION PROTECTION VALVE FOR DECOUPLING SYSTEM PARTS OR WORKPIECES, COMPRISING A SEALING RING

CROSS-REFERENCES TO RELATED APPLICATIONS

This application claims the priority of German Patent Application, Serial No. 10 2019 205 027.1, filed Apr. 8, 2019, the content of which is incorporated herein by reference in its entirety as if fully set forth herein.

FIELD OF THE INVENTION

The invention relates to an explosion protection valve for the decoupling system parts or workpieces for the installation in a pipeline, having the features indicated in the generic term of claim 1.

BACKGROUND OF THE INVENTION

Explosion protection valves of this type are known from a large number of publications, in particular those of the applicant. Thus, the basic operating principle of these explosion protection valves is with a housing, with a closing body axially guided within the housing on a guide rod, which closing body is displaceable from a defined open position in the event of a pressure or suction wave in the pipeline in at least one closing movement direction into a sealing closed position, with a spring assembly on the guide rod, which is operatively connected to the closing body, for holding the closing body in the open position and with a sealing ring on the inside of the housing, against which the closing body can be pressed in its closed position, known from CH 694 303 A5 or CH 694 377 A5.

Two different designs and bearing arrangements of the sealing rings used are disclosed in both publications. On the one hand, a sealing ring of approximately teardrop-shaped cross-section with a slot-shaped receiving groove is fitted onto the annular end edge of a tubular housing portion of the valve housing and bonded there. With its sealing region, against which the closing body is pressed in its closed position, this sealing ring projects into the flow cross-section of the valve, which impedes the free flow of a medium through the explosion protection valve. In addition, the bearing arrangement and support of the sealing ring to ensure the best possible sealing effect in the closed position of the valve requires improvement.

On the other hand, a variant shown in the documents is characterized by a sealing ring of rectangular cross-section which is glued into a corresponding recessed seat on the valve body. The sealing edge, which forms a 90° external angle in cross-section and against which the closing body is pressed in the closed position, is likely to be subject to wear due to its sharp edges and is also in need of improvement with regard to the sealing effect. The rectangular shape of the sealing ring is also not optimal with regard to the flow properties of the medium in the valve.

Explosion protection valves with the basic design and functional sequence as well as bonded sealing rings with the described cross-sectional configurations can also be taken from DE 102 13 865 B4, EP 1 579 134 B1, EP 1 897 668 B1 and DE 101 41 348 B4 of the applicant.

SUMMARY OF THE INVENTION

An object of the invention is to provide an explosion protection valve of the generic type with a sealing ring which is improved with regard to its bearing arrangement and sealing effect.

This object is achieved by the sealing ring being held in an open receiving pocket applied to the inner side of the housing.

Due to the configuration according to the invention, with the aid of the receiving pocket, a particularly stable bearing arrangement of the sealing ring is achieved, with the sealing ring being also relatively easy to mount.

In addition, preferred further developments of the explosion protection valve are indicated. Thus, the receiving pocket may be open counter to the closing movement direction of the closing body. The sealing ring is thus inserted into the receiving pocket in the closing movement direction of the closing body and protrudes therefrom in the opposite direction to the closing movement direction of the closing body, that is to say in the axial direction. Thus, when acted upon in the closed position, the sealing ring is practically pressed into the receiving pocket, which further reinforces its stable support in the critical closed position. In addition, the construction according to the invention does not narrow the flow cross-section of the valve in the radial direction, which entails fluidic advantages.

A further fluidic improvement and constructive simplification of the valve may be achieved if the receiving pocket is delimited on its radially inwardly facing side by a tube portion of the housing.

The sealing ring may be inserted into the receiving pocket with an anchoring portion, the cross-sectional shape of which is substantially configured in a flat-rectangular manner. The insertion length of this anchoring portion may then be at least one third greater than its radial thickness. This in turn serves to stabilize the sealing ring bearing arrangement, which consequently also benefits the sealing behavior of the closing body in the closed position.

The sealing ring may be fixed in the receiving pocket by an adhesive connection known per se. A form-fit connection of the sealing ring in the receiving pocket, however, is more advantageous, since this inherently eliminates any problems that may arise with an adhesive connection and the assembly effort for the adhesion itself. In addition, there are strong advantages in the maintenance of the valve, since long downtimes are eliminated due to the omission of drying times of the required adhesive. Furthermore, there is no need for auxiliary materials for the pre-treatment of the bonding area and pressing of the seal for a clean bonding by means of pressing devices.

Further flow-optimizing measures in the seal design may be realized in an arrangement of the sealing portion of the sealing ring interacting with the closing body in the valve closed position outside and against the closing movement direction in front of the receiving pocket. This further improves the sealing interaction between the closing body and the seal.

According to a preferred further development, the sealing portion of the sealing ring merges smoothly into the tube portion of the housing at its radially inwardly facing rim. This means that there is practically a seamless transition passage between the tube portion and the sealing ring, which in turn is advantageous from a fluidic point of view.

A further improvement of the flow conditions is provided by the connection of the sealing portion of the sealing ring at its radially outwardly pointing rim via a circumferential sealing lip to the inner side of the housing and the spherical, in particular approximately quarter-circular design of the inner contour of the sealing ring, which is contacted by the medium flowing through the valve.

The aforementioned measures serve to optimize the flow conditions in the explosion protection valve, in particular when used cumulatively, as the flow-contacted surfaces are largely smooth and no internal corners or even undercuts are formed.

Further preferred embodiments provide that the sealing ring may be formed as a hollow chamber profile with a circumferential hollow chamber, which in particular extends exclusively in the region of the sealing portion of the sealing ring. Thus, on the one hand, a clean functional separation is achieved between the anchoring of the sealing ring in the housing on the one hand and the improvement of the sealing effect on the other hand. In the anchoring portion, the sealing ring is thus configured solidly, which benefits the stable bearing arrangement. In the region of the sealing portion, the hollow chamber provided there ensures a high flexibility of the sealing ring, which guarantees a clean and tight fit of the closing body around the entire circumference of the sealing ring. At the same time, tolerances caused by welding the housing parts together, other assembly processes and possible out-of-roundness of the rotationally symmetrical closing body may be optimally compensated. The sealing ring also helps to absorb any distortion or uneven thermal expansion caused by uneven flow of hot process medium to the valve.

According to a further preferred embodiment, the cross-section of the seal may also be provided with anchoring projections on the radially inner side, for example, in the form of ribs or barbs, in order to improve the ease of assembly on the anchoring portion. In this way, the solid anchoring portion is more flexible during the assembly, but provides sufficient force to prevent it from being pulled out.

Further features, details and advantages of the invention will be apparent from the following description of an embodiment example with reference to the attached drawings.

DESCRIPTION OF THE PREFERRED EMBODIMENTS

Figure 1:
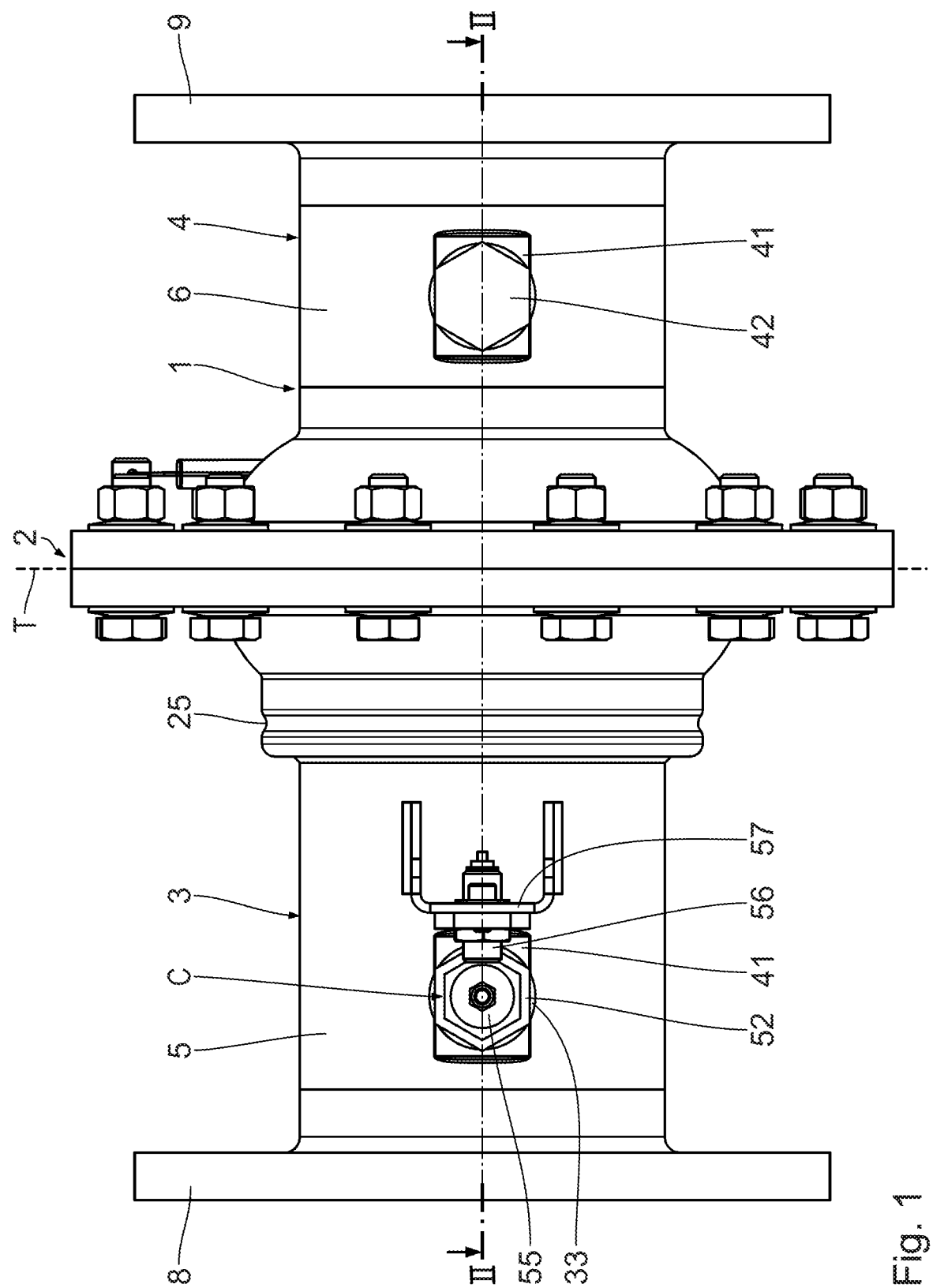
FIG. 1 shows a view of an explosion protection valve from the direction of arrow I according to FIG. 2.
Figure 2:
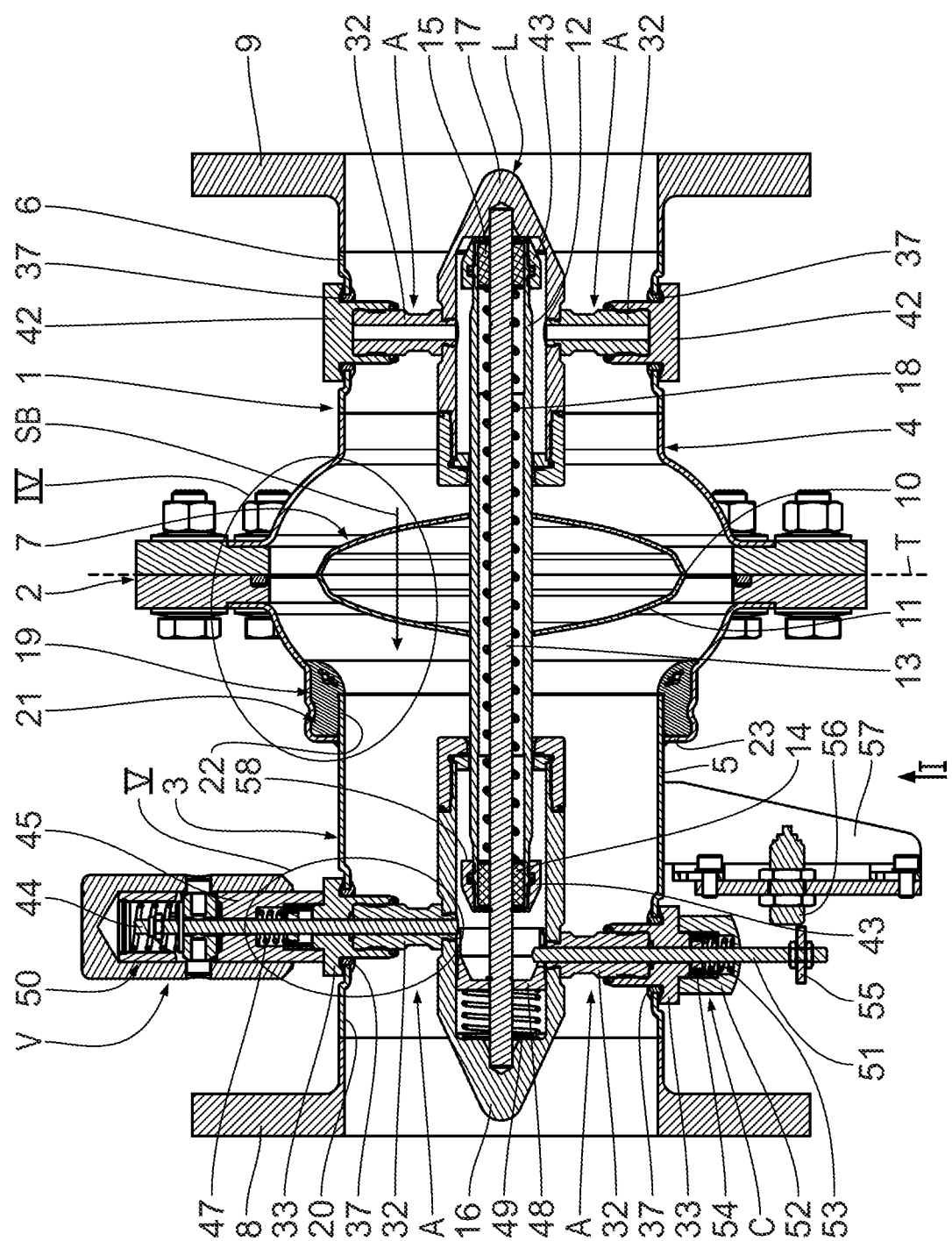
FIG. 2 shows an axial section of the explosion protection valve according to the section line II-II in FIG. 1.
Figure 3:
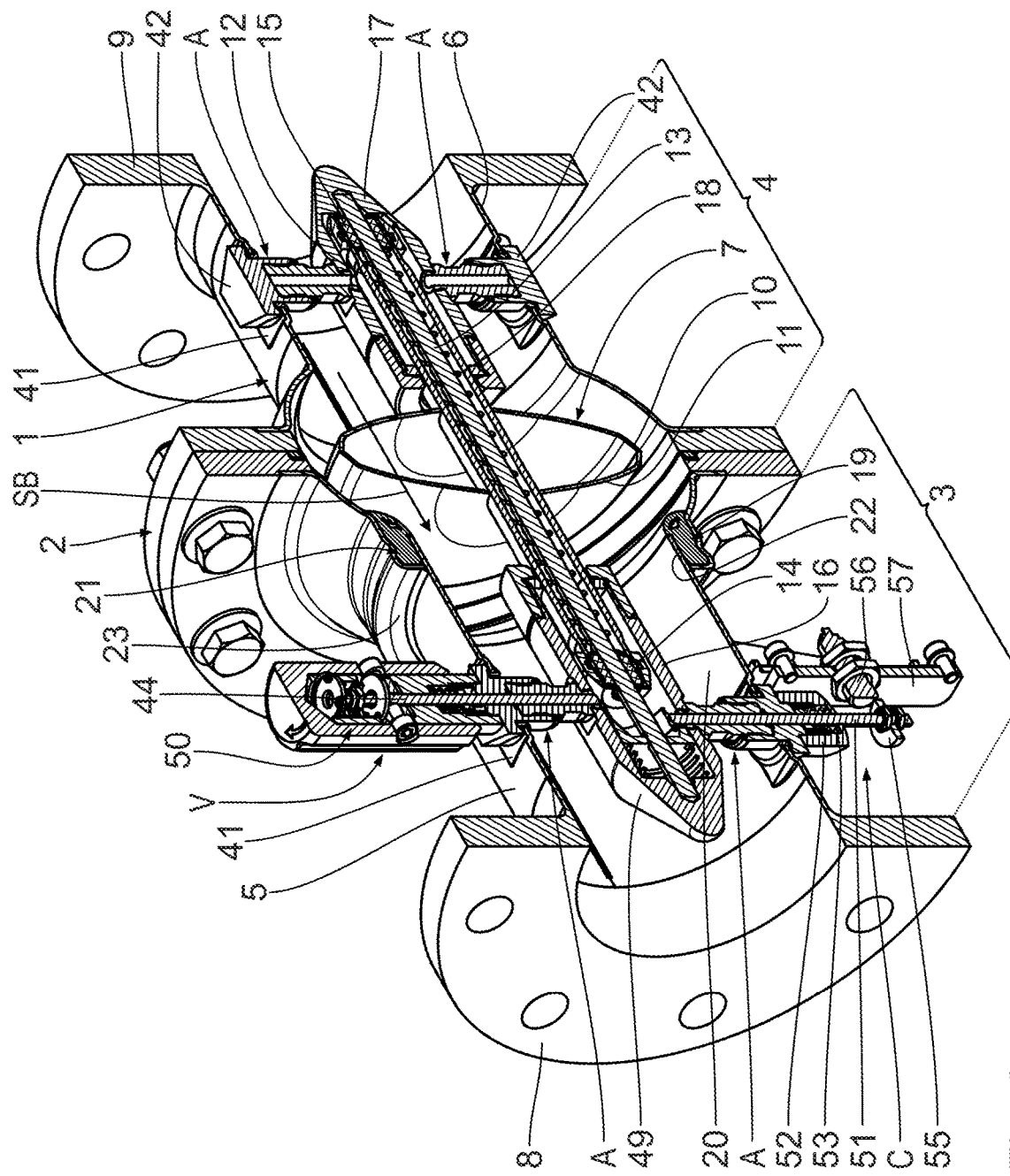
FIG. 3 shows a perspective view, broken away in the sectional plane of FIG. 2, of the explosion protection valve according to FIG. 1, FIGS. 4 and 5 show enlarged detail sections of details IV and V according to FIG. 2

As can be seen from FIGS. 1 to 3, the explosion protection valve shown has a housing 1 composed of two housing halves 3, 4 detachably connected to each other at a central flange connection 2. Towards the flange connection 2, the two housing halves 3, 4 are radially widened with respect to their tubular housing portions 5, 6 in order to ensure a sufficient flow cross-section through the valve in the region of the closing body 7 of the valve, which will be discussed in more detail. At the ends facing away from the flange connection 2, the housing halves 3, 4 are in turn provided with connecting flanges 8, 9 with which the explosion protection valve can be installed in a pipeline not shown.

The internal structure of the explosion protection valve shall be explained with reference to FIGS. 2 and 3. For instance, the mentioned closing body 7 is designed as a rotation-symmetrical hollow body, approximately elliptical in cross-section, around which a medium can flow in the open position shown in FIGS. 2 and 3. The shaping of the closing body 7 with a so-called interfering edge 10 at the periphery and sealing edges 11 is known, for example, from the EP 1 579 134 B1 mentioned at the beginning and does not need to be discussed again here.

The closing body 7 is fastened to a carrier tube 12 which, for the indirect mouting of the closing body 7, is guided for longitudinal axial displacement on a central, longitudinally axially arranged guide rod 13 via sliding bushes 14, 15. The guide rod 13 itself is fastened at each of its ends in cylindrical retaining pieces 16, 17, each of which is designed to be conically tapered in the direction of the flanges 8, 9 in order to optimize the flow conditions through the valve. The retaining pieces 16, 17 are in turn held centrally in the tubular housing portions 5, 6 of the housing halves 3, 4 via four suspensions A to be explained in more detail.

A preloaded helical compression spring 18 is inserted between the guide rod 13 and the carrier tube 12, which is supported, on the one hand, on the left-hand slide bushing 14 (with reference to FIG. 2), which is firmly connected to the guide rod 13, and, on the other hand, on the right-hand slide bushing 15 (with reference to FIG. 2), which is fastened to the right-hand end of the carrier tube 12. Thus, the carrier tube 12 is loaded against the closing movement direction SB of the closing body 7—i.e. to the right with reference to FIGS. 2 and 3—and held in contact in the retaining piece 17. The closing body 7 is thus in the open position of the explosion protection valve shown in FIGS. 2 and 3 and can remain in a stable manner in this open position at specified flow velocities of a medium flowing through the valve.

In the event of an explosion pressure wave passing through the explosion protection valve in the closing movement direction, the closing body 7 is abruptly entrained in this direction against the load of the helical compression spring 18 and pressed with its sealing edge 11 against a sealing ring 19 arranged on the inner side of the housing 1, thus closing the explosion protection valve. In this way, the system parts arranged on the side of the closing body opposite the explosion source, which are connected to the left-hand flange 8 via an outgoing pipe, are protected from the explosion pressure wave and are decoupled from the system part on the interference side. In the closed position of the closing body 7, which is not shown in the figures, the latter is locked via a locking device V to be discussed in more detail, so that the valve remains closed until its reset which can be initiated manually.

In the following, with reference to FIGS. 2 to 4, the special design of the sealing ring 19 of the explosion protection valve interacting with the sealing edge 11 of the closing body 7 will be explained in more detail. For instance, for receiving the sealing ring 19 on the inner side 20 of the housing 1 at the transition passage of the tubular housing portion 5 to the radial extension in the direction of the flange connection 2, a circumferential receiving pocket 21, which is open against the closing movement direction SB, is provided for holding the sealing ring 19. On its radially inwardly facing side, this receiving pocket 21 is formed by the end region 22 of the tubular housing portion 5 itself. The latter is surrounded by the shoulder region 23 of the housing half 3, which is chamfered in cross-section. The sealing ring 19 is inserted into said receiving pocket 21 by means of an anchoring portion 24, which has a substantially flat-rectangular cross-sectional shape corresponding to the cross-sectional shape of the receiving pocket 21. Ribs or barbs may be provided on the radially inner side. As a result, the solid anchoring portion is more flexible during assembly, but provides sufficient force against withdrawal. The insertion length E of the anchoring portion parallel to the closing movement direction SB is thereby greater by about one third than the radial thickness D of the anchoring portion 24. For fixing the anchoring portion 24 in the receiving pocket 21, the latter has a circumferential indentation 25 radially on the outside at the shoulder region 23, by means of which a form-fit connection is produced between the anchoring portion 24 and the receiving pocket 21.

A sealing portion 26 of the sealing ring 19, which interacts with the sealing edge 11 of the closing body 7 in the closed position of the valve, is located outside the receiving pocket 21 and in front of it against the closing movement direction SB. Thus, the sealing portion 26 does not engage in the free flow cross-section of the tubular housing portion 5 of the housing half 3.

Rather, it smoothly merges into the tubular housing portion 5 at its radially inwardly facing rim 27, for which purpose the rim 27 is formed as a projection corresponding to the wall thickness of the tubular housing portion 5. Starting from there, the inner contour 28 of the sealing portion 26, which is flowed towards by the medium through the valve, is outwardly spherical in cross-section, forming a quarter circle. Further, the inner contour 28 then merges towards the radially outwardly pointing rim 29 into a circumferential sealing lip 30 with which the sealing portion 26 adjoins the inner side 20 of the housing half 3.

Figure 4:
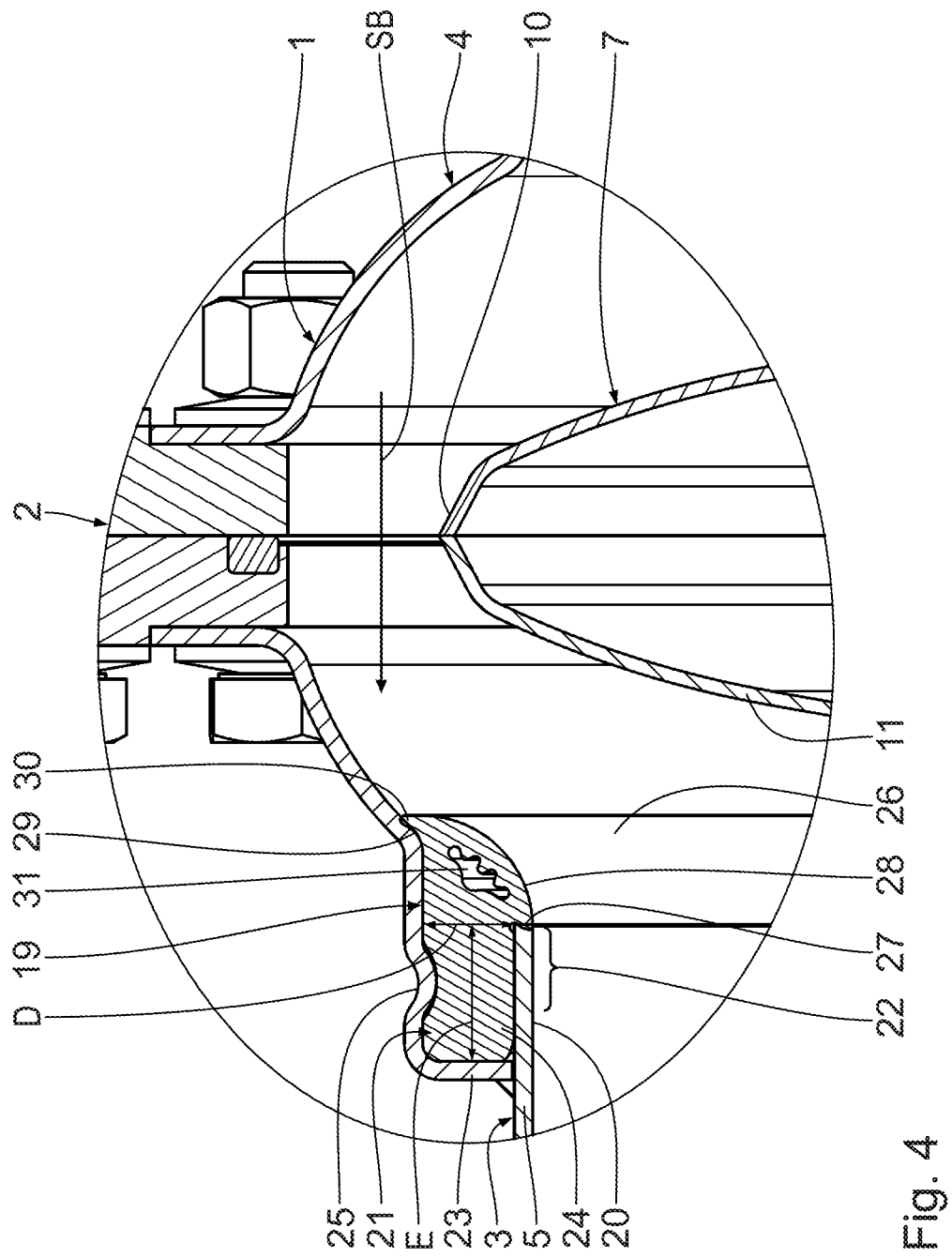

Due to the above-discussed shaping of the sealing ring 19, in particular in the region of the sealing portion 26, the free cross-section of the valve between the open closing body 7 and the inner side 20 of the housing 1 is optimized in terms of flow, as can be seen in particular from FIG. 4, since the transition passages are configured to be relatively smooth-surfaced, no undercuts are provided and no parts of the sealing engage in the free cross-section of the tubular housing portion 5. This also has advantages with regard to the avoidance of product residues and thus improved hygiene when the valve is used accordingly in sensitive industries such as systems for the production of food or pharmaceuticals.

As can be seen further in particular from FIG. 4, a circumferential, structured hollow chamber 31 is provided in the sealing portion 26 of the sealing ring 19, which gives the sealing ring 19 a particular flexibility there. This helps to ensure that the sealing edge 11 of the closing body 7 can cleanly and tightly fit. In doing so, tolerances within the entire assembly due to the welded joints, assembly deviations and out-of-roundness of the closing body 7 can be effectively compensated.

Figure 6:
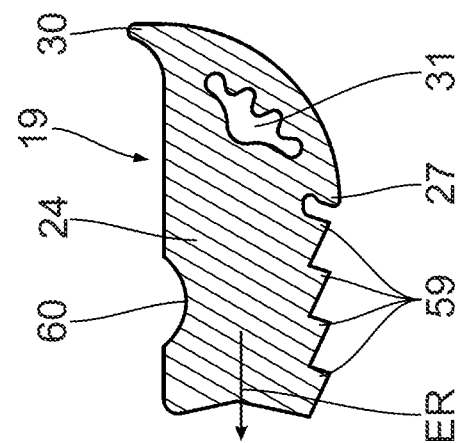
FIG. 6 shows a sealing ring in a second embodiment in cross-section.

In the further development of the sealing ring 19 shown in FIG. 6, ramp-like barb anchoring projections 59 are formed on the radially inner side of the anchoring portion 24, pointing counter to the insertion direction ER, which serve to simplify the assembly and stabilize the anchoring of the sealing ring 19 in the receiving pocket 21 as described above. On the radially outer side of the sealing ring 19 according to FIG. 6, a flat groove 60, which is shaped as a segment of a circle in cross-section and interacts with the indentation 25 on the housing 1, is also shown.

Figure 5:
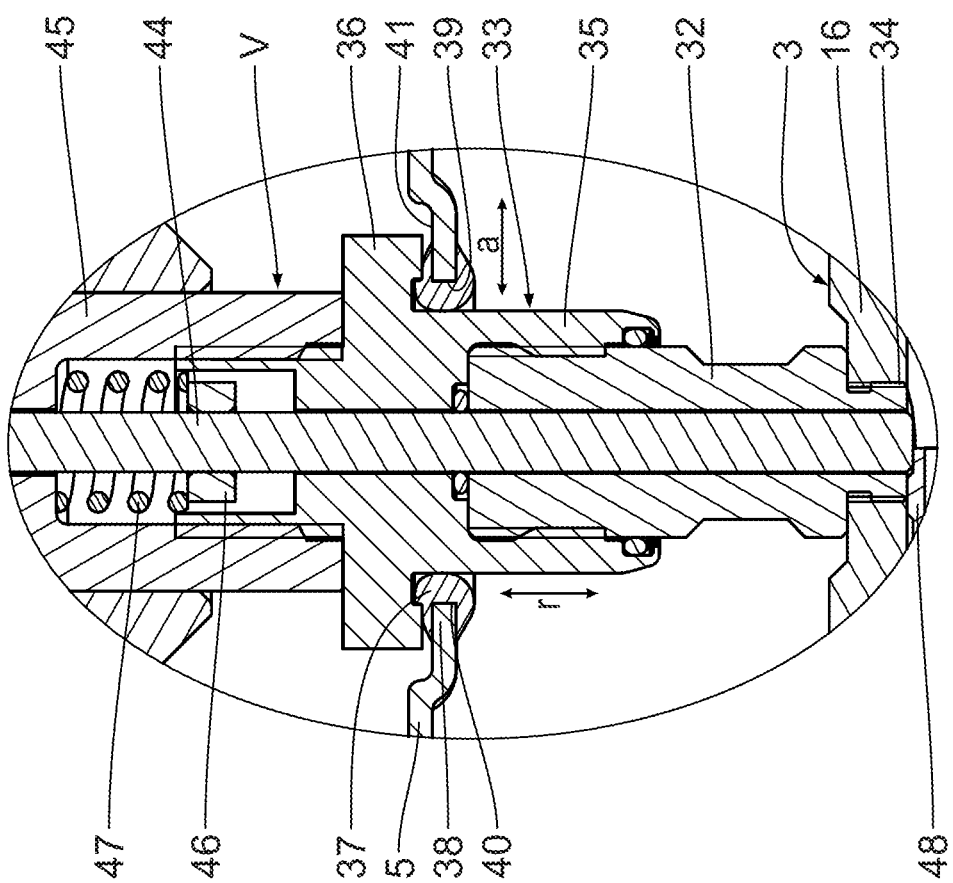

With reference to FIGS. 2, 3 and 5, the further structure of the explosion protection valve with regard to the suspension A and the locking device V as well as its mode of operation will now be described in more detail. The mentioned suspensions A of the retaining pieces 16, 17—except for the equipment of functional means to be discussed in more detail—are designed in principle in the same way for both retaining pieces 16, 17. The four suspensions A present in the embodiment shown are accordingly discussed in more detail with reference to the unit circled with the detail V in FIG. 2 and shown enlarged in FIG. 5. In this case, the retaining pieces 16, 17 support the respective ends of the guide rod 13 as a bearing assembly L and are held on the respective housing half 3, 4 of the housing 1 by means of a suspension cross-member 32 and a receiving adapter 33 holding the latter, with a bearing arrangement subject to play. For this purpose, the suspension cross-member 32 is screwed into a corresponding internal thread 34 in the retaining piece 16, 17. Similarly, the suspension cross-member 32 is received by a threaded bushing 35 on the receiving adapter 33. The latter has an annular shoulder 36, by means of which the receiving adapter 33 is supported on a flexible retaining ring 37. The latter is fastened on the rim 38 of the receiving opening 39 accommodating the receiving adapter 33 in the manner of an edge protection profile. For this purpose, the retaining ring 37 is seated with its bearing groove 40 on the rim of the receiving opening 39. As becomes clear in particular from FIG. 5, the receiving adapter 33 is mounted with play due to the construction shown. Its bearing play acts both in the radial direction r and in the axial direction a (FIG. 5). As becomes particularly clear from FIGS. 3 and 5, the receiving openings 39 for the suspensions A are each arranged in the region of planar bearing surfaces 41 on the otherwise cylindrical housing portions 5, 6. These planar bearing surfaces 41 are embossed into the corresponding housing portions 5, 6.

For a stable mounting of the two retaining pieces 16, 17, the respective suspension cross-members 32 with the receiving adapters 33 are inserted into the corresponding receiving openings 39 and the respective threaded connections are tightened via the internal thread 34 and the threaded bushing 35. Any possible dimensional deviations within the constructional parts are thereby compensated for by the bearing arrangement subject to play of the receiving adapters 33 in the receiving openings 39 via the flexible retaining rings 37.

In the case of the right-hand retaining piece 17, the suspension A serves only to support the retaining piece 17. Accordingly, the receiving adapter 33 is designed there as a closure lid 42 closed off to the outside.

The two suspensions A of the retaining piece 16 located in the closing movement direction SB, i.e. on the side of the closing body 7 opposite the explosion source, are occupied by additional functional means, namely on the one hand the upper suspension A with the locking device V, with reference to FIGS. 2 and 3, and on the other hand the lower suspension A with a sensing device C. These suspensions A thus fulfill a dual function in that, on the one hand, they support the retaining piece 16 and, on the other hand, they ensure access by the additional functional means to the functional mechanism of the explosion protection valve.

This functional mechanism, at the ends of the carrier tube 12, has a catch piece 43 formed as a truncated cone, wherein in the embodiment shown only the catch piece 43 located on the side of the locking device V is functionally relevant. On the one hand, the catch piece 43 arranged at the other end has a functional significance when a bidirectional explosion protection valve is used instead of the unidirectionally acting explosion protection valve shown. On the other hand, in the case of the unidirectionally acting valve shown, it has the function of being able to adjust the central position of the closing body relative to the flange connection 2. For this purpose, the construction shown in FIGS. 2 and 3 would have to be set up mirror-symmetrically at the parting plane T of the flange connection 2 with locking devices V and sensing devices C on both sides.

The locking device V, which is integrated in the suspension A arranged at the top left, as a central part has a radially running locking rod 44 which is guided in a radially displaceable manner in a socket 45 screwed onto the adapter 33, in the receiving adapter 33 itself and in the suspension cross-member 32. Via a collar 46, a release spring 47 configured as a helical compression spring acts to push the locking rod 44 radially inwardly when released. In the resting position shown, the locking rod 44 is retracted upwards and is retained in this resting position by a support bushing 48 which is axially shiftable in the retaining piece 16. The latter is loaded counter to the closing movement direction SB by a further helical compression spring 49.

A return mechanism 50 is configured at the upper end of the socket 45, which is known through obvious prior use. Since this return mechanism 50 has no central significance for the invention itself, a detailed description will be omitted in order to avoid unnecessary lengthiness.

On the side opposite the locking device V, the sensing device C is integrated into the suspension A, wherein in this case a sensing rod 51 is guided in a radially shiftable manner in the receiving adapter 33 and the corresponding suspension cross-member 32. A bearing cap 52 is screwed onto the receiving adapter 33, into which in turn a helical compression spring 53 is inserted for loading the sensing rod 51 via a collar 54 attached thereto in a radially inward direction. At the end of the sensing rod 51 projecting from the bearing cap 52, a feeler piece 55 is provided which interacts with a proximity switch 56. The latter is held on a bearing strut 57 at the bottom of the tubular housing portion 5. Alternatively, a mechanical switch may also be attached, which is mounted in a radial extension of the sensing rod 51 and is also mounted to the bearing strut 57 by means of an adapter sheet.

In the event of an abrupt pressure wave passing through the explosion protection valve due to an explosion in a part of the system located to the right of the valve shown, the closing body 7 is abruptly shifted in the closing movement direction SB to the left in relation to FIGS. 2 and 3 by the application of pressure against the force of the helical compression spring 18 and seals the valve in its closed position by abutting against the sealing ring 19.

With the movement of the closing body 7, the carrier tube 12 is shifted with the catch piece 43, which strikes against the support bushing 48 shiftably mounted in the retaining piece 16 and also displaces same to the left against the action of the helical compression spring 49. This releases the locking rod 44 which, when the carrier tube 12 is deflected accordingly, retracts with the closing body 7 to the left behind the rear catch edge 58 of the catch piece 43. Thus, the closing body 7 and correspondingly the explosion protection valve is locked in its closed position.

During the described triggering process, the conical front portion of the catch piece 43 simultaneously pushes the sensing rod 51, which engages inwardly via a slot in the support bushing 48, outwardly against the action of the helical compression spring 53. This causes the sensing piece 55 to move away from the proximity switch 56, allowing the latter to provide an electric signal to a corresponding control (not shown) that the explosion protection valve has been triggered. Alternatively, depending on the signal required from the control, the retaining sheet of the proximity switch 56 may be rotated by 180° and the sensing piece 55 moves into the sensing region of the proximity switch 56. If a mechanical switch is used, the sensing piece is omitted and the sensing rod directly actuates the mechanical switch.

For the return of the explosion protection valve to the open position shown in FIGS. 2 and 3, the locking rod 44 is moved back upwards via the return mechanism 50. As a result, the catch piece 43 is released and the carrier tube 12 with the closing body 7 may return to the open position under the influence of the helical compression spring 18. In the process, the support bushing 48 is returned to the support position shown in FIG. 2 under the retracted locking rod 44. At the same time, the sensing rod 51 may retract again under the influence of the helical compression spring 53 into the sensing position within the support bushing 48 as shown in FIGS. 2 and 3.

The invention claimed is:

1. An explosion protection valve for decoupling one of the group comprising system parts and workpieces for the installation in a pipeline, the explosion protection valve comprising:
    a housing;
    a closing body which is axially guided inside the housing on a guide rod and can be shifted from a defined open position into a sealing closed position in the event of one of the group comprising a pressure wave and a suction wave in the pipeline in at least one closing movement direction;
    a spring assembly, which is in operative connection to the closing body, on the guide rod for holding the closing body in the open position;
    a sealing ring on an inner side of the housing, against which the closing body can be pressed in its closed position, an open receiving pocket applied to the inner side of the housing for holding the sealing ring, wherein the receiving pocket is delimited on a radially inwardly facing side thereof by a tubular housing portion of the housing, wherein a sealing portion of the sealing ring, at its radially inwardly pointing rim thereof, merges smoothly into the tubular housing portion of the housing, wherein the sealing portion of the sealing ring, interacting with the closing body in the closed position of the valve, is arranged outside and against the closing movement direction in front of the receiving pocket, wherein the sealing portion of the sealing ring adjoins the inner side of the housing at its radially outwardly pointing rim in a circumferential sealing lip, wherein an inner contour of the sealing ring merges towards the radially outwardly pointing rim into the circumferential sealing lip.

2. An explosion protection valve according to claim 1, wherein the receiving pocket is open counter to the closing movement direction of the closing body.

3. An explosion protection valve according to claim 1, wherein the sealing ring is inserted into the receiving pocket by means of an anchoring portion, the cross sectional shape of which is essentially flat-rectangular with an insertion length which is greater by at least one third than a radial thickness of the anchoring portion.

4. An explosion protection valve according to claim 3, wherein the anchoring portion of the sealing ring is provided with anchoring projections acting counter to the insertion direction.

5. An explosion protection valve according to claim 1, further comprising one of the group comprising a form-fitting connection and an adhesive connection for fixing the sealing ring in the receiving pocket.

6. An explosion protection valve according to claim 1, wherein the inner contour of the sealing ring, which can be contacted by the medium flowing through the valve, is configured spherically.

7. The explosion protection valve according to claim 6, wherein the spherical inner contour of the sealing ring is configured to be approximately quarter-circular.

8. An explosion protection valve according to claim 1, wherein the sealing ring is formed as a hollow chamber profile with a circumferential hollow chamber.

9. An explosion protection valve according to claim 1, wherein a hollow chamber extends exclusively in the region of the sealing portion.

10. An explosion protection valve according to claim 1, wherein a seamless transition is provided between the housing and the sealing ring.

11. An explosion protection valve according to claim 1, wherein a flow contact side of the housing and a flow contact side of the sealing ring are free of internal corners or undercuts.

12. An explosion protection valve according to claim 1, wherein the sealing portion does not engage in a free flow cross-section of the housing.

13. An explosion protection valve according to claim 1, wherein a portion of the inner contour of the sealing ring is even with an inner surface of the tubular housing portion of the housing, wherein no edges or undercuts are formed where the sealing portion merges with the housing.

14. An explosion protection valve for decoupling one of system parts and workpieces for installation in a pipeline, the explosion protection valve comprising:
- a housing comprising a first housing portion and a second housing portion, the first housing portion and the second housing portion defining a sealing ring receiving opening, the first housing portion comprising a first housing portion surface facing in an axial direction of the housing with respect to a longitudinal axis of the housing, the first housing portion further comprising a first housing portion inner surface, the second housing portion comprising a second housing portion inner surface;
- a closing body axially guided inside the housing on a guide rod, the closing body being configured to move from a defined open position into a sealing closed position based on one of a pressure wave and a suction wave in the pipeline in at least one closing movement direction;
- a spring assembly connected to the closing body, the spring assembly extending about the guide rod for holding the closing body in the open position;
- a sealing ring comprising a radially outwardly facing rim comprising a circumferential sealing lip, a radially inwardly facing rim, and a sealing ring inner surface extending from the radially outwardly facing rim to the radially inwardly facing rim, the radially outwardly facing rim engaging the second housing portion inner surface, the radially inwardly facing rim engaging the first housing portion surface, wherein a portion of the sealing ring inner surface and a portion of the first housing portion inner surface are in a same plane, at least a portion of the sealing ring being arranged in the sealing ring receiving opening.

15. An explosion protection valve according to claim 14, wherein the sealing ring inner surface defines an inner contour of the sealing ring, the inner contour extending towards the radially outwardly pointing rim into the circumferential sealing lip.

16. An explosion protection valve according to claim 14, wherein a seamless transition is provided in an area in which the first housing portion contacts the sealing ring.

17. An explosion protection valve according to claim 14, wherein a flow contact side of the housing and a flow contact side of the sealing ring are free of internal corners or undercuts.

18. An explosion protection valve according to claim 14, wherein the sealing ring comprises an anchoring portion having a flat-rectangular cross sectional shape, the anchoring portion comprising an insertion length that is greater by at least one third than a radial thickness of the anchoring portion.

19. An explosion protection valve according to claim 14, further comprising one of the group comprising a form-fitting connection and an adhesive connection for fixing the sealing ring in the sealing ring receiving opening.

20. An explosion protection valve according to claim 14, wherein an inner contour of the sealing ring, which can be contacted by the medium flowing through the valve, is configured spherically.

* * * * *